United States Patent [19]
Shoji et al.

[11] Patent Number: 5,996,228
[45] Date of Patent: *Dec. 7, 1999

[54] MONOLITH-HOLDING ELEMENT, PROCESS FOR PRODUCING THE SAME, CATALYTIC CONVERTER USING A MONOLITH MEMBER AND PROCESS FOR PRODUCING THE SAME

[75] Inventors: Mamoru Shoji; Toshiaki Sasaki, both of Joetsu; Hitoshi Ohta, Chita-gun; Masayuki Kasuya, Tokai, all of Japan

[73] Assignees: Mitsubishi Chemical Corporation; Nippon Steel Corp., both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/750,497
[22] PCT Filed: Apr. 12, 1996
[86] PCT No.: PCT/JP96/01017
  § 371 Date: Apr. 11, 1997
  § 102(e) Date: Apr. 11, 1997
[87] PCT Pub. No.: WO96/32574
  PCT Pub. Date: Oct. 17, 1996

[30] Foreign Application Priority Data

Apr. 13, 1995 [JP] Japan ................................. 7-088174
Nov. 21, 1995 [JP] Japan ................................. 7-326555

[51] Int. Cl.⁶ .................................................. F01N 3/28
[52] U.S. Cl. ................................... 29/890; 422/179
[58] Field of Search .................................. 422/179, 180, 422/171, 221, 222, 211; 428/116, 593, 594; 502/439; 29/890

[56] References Cited

U.S. PATENT DOCUMENTS 4,929,429  5/1990  Merry ......................................... 422/179

FOREIGN PATENT DOCUMENTS 7197812    8/1995   Japan .
7-286514  10/1995   Japan .
8-174687   7/1996   Japan .
9424425   10/1994   WIPO .

*Primary Examiner*—Hien Tran
*Attorney, Agent, or Firm*—Nims, Howe, Collison Hansen & Lackert

[57] ABSTRACT

A monolith-holding element adapted to be used in an exhaust system of internal combustion engines, a process for producing the monolith-holding element, a catalytic converter and a process for producing the catalytic converter are disclosed, in which the specific monolith-holding element is produced by uniformly dispersing an organic binder in a compressed alumina fiber mat, exhibits a thickness-restoring property when the organic binder is thermally decomposed by the contact with a high-temperature exhaust gases, and supports a monolith by exerting a surface pressure on an outer peripheral surface of the monolith and an inner peripheral surface of the metal casing. The monolith-holding element has an excellent durability and gas-sealing properties and the catalytic converter can withstand severe vibration and impact for a long period of time.

2 Claims, 2 Drawing Sheets

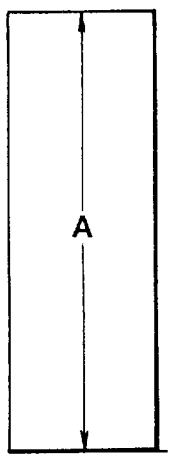
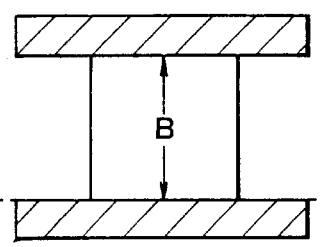
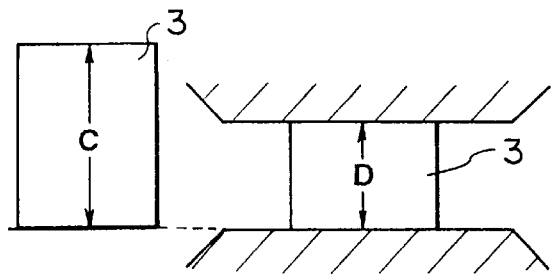
FIG.3a  FIG.3b  FIG.3c  FIG.3d

MONOLITH-HOLDING ELEMENT, PROCESS FOR PRODUCING THE SAME, CATALYTIC CONVERTER USING A MONOLITH MEMBER AND PROCESS FOR PRODUCING THE SAME

TECHNICAL FIELD

The present invention relates to a monolith-holding element, a process for the production of the monolith-holding element, a catalytic converter using a monolith member composed of a monolith and monolith-holding element, and a process for the production of the catalytic converter. The monolith-holding member according to the present invention is maintained in a compressed state by a bonding force of an organic binder upon assembling, and restore its inherent thickness and exhibits a required surface pressure in a both surface-supporting state by the thermal decomposition of the organic binder after heating. In the catalytic converter according to the present invention, the afore-mentioned monolith-holding element stably supports the monolith within a casing for a long period of time.

BACKGROUND ART

In exhaust systems of internal combustion engines, various catalytic converters containing heavy metals or noble metals as a catalyst have been used as an apparatus for cleaning exhaust gases in order to treat and remove harmful components in the exhaust gases, such as carbon monoxide or various hydrocarbons. These catalytic converters are classified into the following two types according to the configuration of catalysts used therein:

(1) Catalytic converter comprising a pellet-like catalyst prepared by supporting a metal catalyst on a granular carrier made of ceramics or the like, and a metal casing for accommodating the pellet-like catalyst; and (2) Catalyst converter comprising a so-called integrated catalyst prepared by supporting a metal catalyst on a tubular monolith carrier (hereinafter referred to merely as "monolith") inside of which a plurality of flow paths for passing exhaust gases are provided, and a metal casing accommodating the integrated catalyst and connected with exhaust pipes.

The catalytic converters (2) have been more predominately utilized as compared with those of the catalytic converters (1) because the catalytic converters (2) do not show abrasion due to collision between pellets as observed in the catalytic converters (1) and have relatively miniaturized the apparatus. In the catalytic converters (2), in order to securely mount a monolith member within a metal casing, a monolith-holding element is wound around a monolith.

In many cases, the monoliths made of ceramics or metals have been used in order to impart a heat resistance thereto. Further, in order to reduce a flow resistance during passing of exhaust gases and enhance an efficiency of the catalyst, there have been predominately utilized monoliths having a honeycomb structure, whereby more larger surface area can be assured in flow paths of exhaust gases.

As an appropriate structure of the metal casings, there has been adopted a two-piece clamshell structure in which the monolith member is sandwiched between shell halves of the metal casing and the mating portions of the shell halves are welded together, or a stuffing box structure in which the monolith member is inserted into the metal casing.

In either the clamshell or stuffing box structure, it is required that the thickness of the monolith-holding element is identical with or slightly larger than a clearance between an outer peripheral surface of the monolith and an inner peripheral surface of the metal casing in order to securely fix the monolith within the metal casing. This is because the decrease in retaining force of the monolith-holding element against the monolith causes inconveniences such as separation or displacement of the monolith within the metal casing, leakage of exhaust gases from the outer peripheral surface of the monolith, or the like, during operation. Occurrence of such inconveniences is highly detrimental to the catalytic converters.

Especially, in the case where a ceramic monolith is used in the catalytic converter, the clearance between the outer peripheral surface of the monolith and the inner peripheral surface of the metal casing becomes large during operation because the monolith itself exhibits a small thermal expansion while the metal casing exhibits a large thermal expansion. As a result, there has been a tendency that the retaining force of the monolith-holding element becomes decreased. In addition, in the production of the catalytic converter, in the case where such a monolith having an extremely size and showing a relatively large dispersion in its outer dimension is used, a retaining force required for securely holding the monolith cannot be often obtained upon assembling.

Accordingly, in order to obtain a desired retaining force of the monolith-holding element over a wide temperature range from a normal temperature to a high temperature during operation, it is required that the monolith-holding element can follow the difference in size of the clearance caused by fluctuated outer dimensions of the individual monoliths, or the change in the clearance due to difference in thermal expansion between the monolith and the metal casing.

In recent years, intense studies have been made on a method for fixing the monolith within the metal casing. As a result, as monolith-holding elements adapted to be fitted into a clearance between the outer peripheral surface of the monolith and the inner peripheral surface of the metal casing, there have been proposed monolith-holding elements prepared by forming an inorganic fiber material into various configurations. The techniques previously proposed for monolith-holding elements and problems caused thereby are described below.

Japanese Patent Application Laid-open (Kokai) No. 1-240715 (1989) discloses an elastic mat (monolith-holding element) composed of non-shot ceramic fiber which is sewed up and compressed in the thickness direction. However, such an elastic mat is compressed so as to reduce its thickness only when sewed up at a small sewing pitch. In the case where the small sewing pitch is used, there arise problems that the elastic mat is damaged, thereby resulting in lack of elasticity thereof, or that it becomes difficult to conduct delicate processing such as formation of labyrinth structures at opposite joining ends of the elastic mat. Further, there arise problems concerning the fraying, cutting or the like of threads at the sewed end portions of the elastic mat.

British Patent No. 2171180A discloses a mat-like product (monolith-holding element) prepared by vacuum-packing an inorganic fiber in a plastic bag. However, the plastic bag used in such a mat-like product does not have a flexibility. Further, since it is difficult to wind the mat-like product around the monolith in a close contact manner and provide labyrinth structures at opposite joining ends of the plastic bag, there arises a problem concerning sealing properties. Furthermore, there is such a inconvenience that the plastic bag film is likely to be broken upon transportation or assembling.

U.S. Pat. No. 4,693,338 discloses a monolith-holding element which comprises, in combination, a blanket prepared by highly compressing a ceramic fiber together with a small amount of a binder, and knitting yarns made of a !4j ceramic fiber. However, such a monolith-holding element requires complicated mounting procedures and assembling steps, and therefore, is unsatisfactory.

Japanese Patent Application Laid-open (Kokai) Publication No. 53-2753 (1978) discloses a heat-insulating element (monolith-holding element) prepared by compression-molding a fiber-based heat-insulating material such as ceramic fiber, silica fiber, glass fiber or the like together with an organic binder at a compression ratio higher than that in actual use. However, such a monolith-holding element is deteriorated in elasticity and shows accelerated thermal degradation such as softening or shrinkage in a high-temperature range, though it exhibits a thickness-restoring property in association with thermal decomposition of the organic binder. In addition, since the thickness of the monolith-holding element is thinner than the clearance, the monolith is caused to move within the casing before the thermal decomposition of the organic binder, thereby resulting in damage to the monolith.

Japanese Patent Application Laid-open (Kokai) No. 7-77036 (1995) discloses a catalytic converter having a heat-resistant and non-thermally-expansive ceramic fiber, which comprises a metal casing, a ceramic honeycomb catalyst (monolith) accommodated within the metal casing, and a ceramic fiber mat as a monolith-holding element fitted in an compressed state between an outer surface of the honeycomb catalyst and an inner surface of the metal casing. The catalytic converter disclosed therein includes the ceramic fiber mat having such a compression property which is not largely increased or decreased within a practically used temperature range. However, since no binder is contained in the afore-mentioned ceramic fiber mat, it is required to highly compress the ceramic fiber mat upon assembling. This causes deterioration in working properties and other problems such as breaking of the fiber due to lack of a mechanical strength thereof, scattering of the fiber or the like.

Japanese Patent Application Laid-open (Kokai) No. 57-56615 (1982) discloses an apparatus for cleaning exhaust gases, which comprises a metal casing, a ceramic monolith and a sealing element as a monolith-holding element fitted into a clearance between an inner circumferential surface of the metal casing and an outer circumferential surface of the monolith. The sealing element disclosed therein is composed of a ceramic fiber having a fiber diameter of 6 to 30 $\mu$m, and has a bulk density of 0.1 to 0.35 g/cm$^3$. Further, the sealing element is compressed such that the ratio between thicknesses before and after installation thereof is within the range of 2.7 to 8.7. However, since the sealing element has such a small bulk density and such a large compression ratio, there arises a problem concerning working properties upon assembling.

On the other hand, in the consideration of a heat resistance and cushioning properties of the ceramic fiber, as the monolith-holding element there have been proposed sheet elements prepared by blending the ceramic fiber with a thermally-expansive material such as vermiculite or the like for compensating a retaining force thereof.

Japanese Patent Application Laid-open (Kokai) No. 7-127443 (1995) discloses a ceramic honeycomb catalytic converter comprising a metal casing, a ceramic honeycomb catalyst (monolith), a gripping element (monolith-holding element) composed of a ceramic fiber mat disposed in an compressed state so as to retain the ceramic honeycomb catalyst by its restoring force, and a fixing member for securing the gripping element at the flowing direction of exhaust gases, the fixing member being possessed in the metal casing. However, the gripping elements made of a ceramic fiber mat is maintained in a non-compressed condition and therefore, must be highly compressed upon mounting, whereby there arise problems such as the deterioration of working properties and the breaking of the ceramic fiber itself. Further, there is a tendency that the honeycomb catalyst is damaged by a tightening force of the fixing member which is adapted to prevent a floating movement of the honeycomb catalyst.

In addition, Japanese Patent Publication (Kokoku) No. 58-17335 (1983) discloses a process for producing an integrated catalyst component (catalytic converter) comprising an integrated catalyst (monolith), a ceramic fiber molded-element which is separated in a circumferential direction of the integrated catalyst and wound around an outer circumferential surface of the integrated catalyst, and a casing securely receiving the integrated catalyst therein, which process comprises the steps of tightening the ceramic fiber molded-elements by means of compression rings having a separated structure from its outer peripheral side, covering end portions of the compression rings together with end faces of the ceramic fiber molded-elements by retaining rings, and accommodating the integrated catalyst within the casing. In such a catalytic converter produced according to the afore-mentioned technique, the ceramic fiber molded-elements are prevented from being damaged upon assembling and the end portions thereof is also protected from exhaust gases. However, since the clearance between the integrated catalyst and the casing, i.e., the clearance between the outer peripheral surface of the monolith and the inner peripheral surface of the metal casing is considerably fluctuated depending upon the difference in coefficient of thermal expansion therebetween, it cannot be expected that the ceramic fiber molded-elements exhibits sufficient supporting effects.

Meanwhile, ceramic monoliths composed mainly of cordierite have been most widely utilized because they are relatively less expensive and excellent in thermal dimensional stability. In accordance with the strengthening of regulations of exhaust gases, efforts have been made to enhance an efficiency of the catalyst by increasing temperature characteristics thereof, and to increase a catalytic surface area and decrease a heat capacity by reducing a wall thickness of the honeycomb catalyst. However, the reduction in wall thickness of the ceramic monolith is limited by the production conditions or the mechanical strength of the structure. In consequence, it has been recognized that metal monoliths are preferable as compared with the ceramic monoliths.

In general, the metal monoliths are composed of aluminum-containing ferrite-based stainless steel foils having a thickness of 50 to 100 $\mu$m. Since among of the stainless steel foils other than the ferrite-based foils, for example austenite-based stainless steel foils show a large thermal expansion or martensite-based stainless steel foils are difficult to undergo bending, these are not put into practical use.

The ferrite-based stainless steel foils monoliths are prepared by winding a laminate composed of a flat foil and a corrugated foil into a form of roll and then bonding the opposite ends of the roll together by brazing to form a cylindrical material. Such metal monoliths have a reduced wall thickness which is ½ to ⅓ or less of the wall thickness of the ceramic monoliths. Therefore, nevertheless the metal monolith has the same size as that of the ceramic monolith, the metal monolith can show considerably larger opening rate and surface area, and considerably smaller heat capacity as compared with those of the ceramic monolith, resulting in achieving a high cleaning efficiency for exhaust gases. Further, the metal monoliths are excellent in dimensional accuracy upon the production and shows advantages such as a resistance to rupture or fracture. As a result, the metal monoliths are considered to be stably predominately utilized in future.

In catalytic converters using the afore-mentioned metal monoliths, a structure capable of integrally bonding the monolith to the surrounding metal casing is adopted in order to ensure bonding of the metal monolith by brazing. However, the afore-mentioned structure using the metal monolith can show various above-mentioned advantages required for a catalyst carrier as compared with the structure using the ceramic monoliths. Since a heat generated in the monolith is directly transferred to the surrounding metal casing, there arises a problem that the metal monolith is rapidly cooled during the idling operation.

As techniques concerning catalytic converters using metal monoliths, Japanese Utility Model Application Laid-open (Kokai) No. 1-80620 discloses a carrier for a catalyst for cleaning exhaust gases, which comprises a sheathed pipe, a metal monolith and a thermally-expansive sheet material interposed between the sheathed pipe and the metal monolith. However, when the metal monolith is exposed to exhaust gases having a temperature as high as not less than 800° C., the heat resistance thereof is extremely deteriorated. In the case of the metal monolith disclosed in the above-mentioned Japanese Utility Model KOKAI, there arises such a problem that the honeycomb monolith is readily buckled by a pressure generated due to the thermal expansion of the thermally-expansive sheet material wound around an outer peripheral surface of the monolith.

In addition, in order to solve the afore-mentioned problems, Japanese Patent Application Laid-open (Kokai) No. 6-126191 discloses a catalytic converter using a metal monolith, in which the metal monolith is fixed in the catalytic converter in the same manner as used for fixing the ceramic monolith by the monolith-holding element. The catalytic converter disclosed in the Japanese Patent KOKAI comprises a monolith having a honeycomb structure prepared by winding a flat plate and a corrugated plate both made of metal foil into a form of roll, a metal ring having a short axial length and bonded to an outer peripheral surface of the monolith, a casing accommodating the monolith and a thermally-expansive sealing element fitted into a clearance between the ring and the casing.

In the catalytic converter disclosed in the Japanese Patent KOKAI, since the thermal expansion of the monolith becomes larger than that of the metal ring or the like as a monolith-holding element with temperature rise, a high tightening force is temporarily exerted on the monolith by the metal ring or the like as a monolith-holding element. Besides, since the thermally-expansive sealing element made of a ceramic wool further compresses the monolith by means of the metal ring, the monolith is likely to be buckled. As a result, there arises such a problem that the monolith is apt to cause a floating movement within the metal casing during operation.

Furthermore, WO 94/24425 discloses a mat comprising an integrated composite sheet composed of a ceramic fiber and a binder, wherein the ceramic fiber contains substantially no shot and has an average fiber length of about 1 cm to about 10 cm, and the mat has an integral flexible structure and generates a substantially constant pressure over a temperature range of about 20 to about 1,200° C., when the mat is fitted into the clearance. However, such a mat has a problem that it requires complicated drying processes, and further a ratio of the compression required upon mounting is considerably large, resulting in deterioration of working properties. In addition, since it is disclosed that from the consideration of the specific characteristic, i.e., the substantially "constant" pressure is generated when mounted into the clearance, it is suggested that the content of the organic binder resin in the mat is small, so that there is a tendency that the fiber in the mat is damaged by the frictional contact with the casing upon mounting. Accordingly, it is expected that deterioration in retaining force of the mat against the monolith, leakage of exhaust gases from the outer peripheral surface of the monolith are caused.

The present invention has been accomplished in order to solve the afore-mentioned problems. An object of the present invention is to provide a monolith-holding element and a process for producing the monolith-holding element, in which the monolith-holding element is preliminarily kept in a compressed state upon assembling of the catalytic converter, and therefore, has a small thickness so as to be readily mounted thereto; the monolith-holding element can exhibit a thickness-restoring property when heated and a required surface pressure between an outer peripheral surface of the monolith and an inner peripheral surface of a metal casing, and does not show any deterioration in properties after used for a long period of time; and the monolith-holding element is not corroded even when exposed to exhaust gases having a high-flow rate, and therefore, can maintain sufficient sealing properties.

Another object of the present invention is to provide a catalytic converter and a process for producing the catalytic converter, in which the afore-mentioned monolith-holding element is fitted into a clearance between the outer peripheral surface of the monolith and the inner peripheral surface of the metal casing; and the catalytic converter can withstand the high-temperature of exhaust gases and can stably support the monolith even when exposed to severe vibration and impact, so that there is no leakage of exhaust gases from the monolith-holding element.

BRIEF DESCRIPTION OF THE DRAWINGS

FIG. 3 is a view schematically showing change in state of an alumina fiber mat up to the production of the monolith-holding element.

DISCLOSURE OF THE INVENTION

Figure 1:
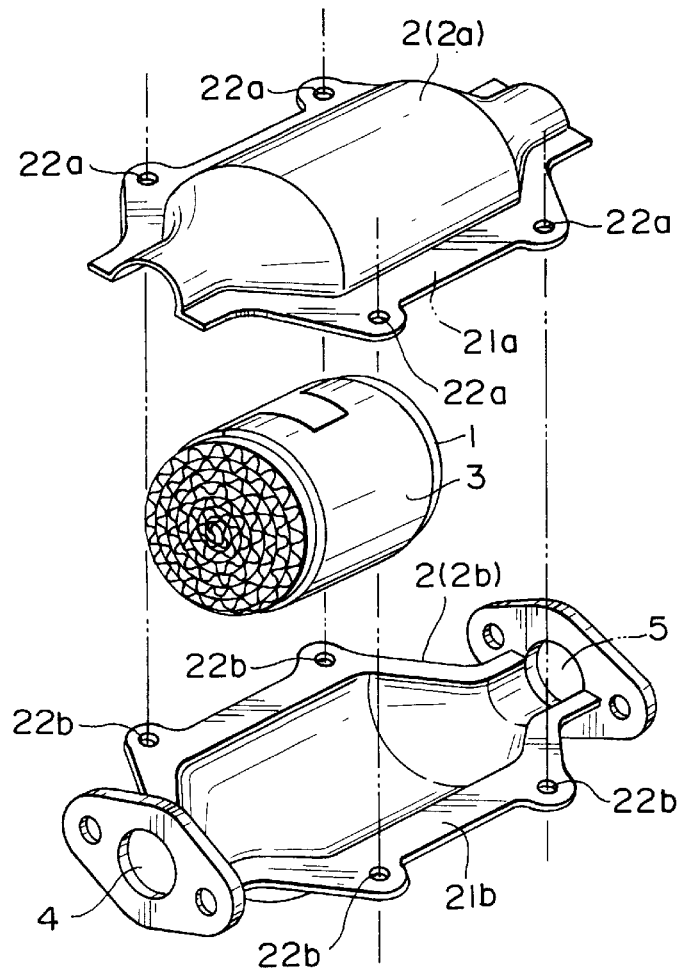
FIG. 1 is an exploded perspective view of a catalytic converter according to one embodiment of the present invention.

As a result of intense studies by the present inventors to accomplish the afore-mentioned objects, it has been found that by preparing the monolith-holding element from an alumina fiber mat which produces a predetermined restoring force when compressed so as to reduce its thickness to that corresponding to a clearance between an outer peripheral surface of the monolith and an inner peripheral surface of the metal casing, the monolith is prevented from being buckled and the monolith-holding element can show sufficient supporting effects. The present invention has been attained on the basis of the finding.

That is, the present invention relates to a monolith-holding element, a process for producing the said monolith-holding element, a catalytic converter using a monolith and a process for producing the said catalytic converter. Various aspects of the present invention are described below.

In a first aspect of the present invention, there is provided a monolith-holding element for use in a catalytic converter comprising a cylindrical monolith supporting a catalyst for cleaning exhaust gases thereon, a metal casing accommodating the monolith and connected to exhaust pipes, and the monolith-holding element fitted into a clearance between an outer surface of the monolith and an inner surface of the metal casing, which monolith-holding element comprises an alumina fiber mat compressed in the thickness direction thereof and an organic binder uniformly dispersed in the alumina fiber mat and capable of being dissipated by thermal decomposition thereof, the monolith-holding element being produced by a process comprising (I) the first step of impregnating the alumina fiber mat with a solution containing the organic binder, (II) the second step of compressing the alumina fiber mat impregnated with the organic binder-containing solution in the thickness direction, and (III) the third step of removing a solvent of the organic binder-containing solution while maintaining the thickness of the compressed alumina fiber mat, wherein the thickness of the monolith-holding element produced in the third step is 1 to 1.5 times the thickness of the alumina fiber mat compressed in the second step, and when the organic binder is thermally decomposed, the monolith-holding element exhibits a thickness-restoring property with opposite surfaces thereof kept in an open state, and a restoration surface pressure of the monolith-holding element being kept under such a compressed condition that the thickness thereof is reduced to that corresponding to the clearance, is in the range of 0.5 to 30 $kg/cm^2$.

In a second aspect of the present invention, there is provided a monolith-holding element for use in a catalytic converter comprising a cylindrical monolith supporting a catalyst for cleaning exhaust gases thereon, a metal casing accommodating the monolith and connected to exhaust pipes and the monolith-holding element fitted into a clearance between an outer peripheral surface of the monolith and an inner peripheral surface of the metal casing, which monolith-holding element comprises an alumina fiber mat compressed in the thickness direction thereof and an organic binder uniformly dispersed in the alumina fiber mat and capable of being dissipated by thermal decomposition thereof, wherein the monolith-holding element maintained in a compressed condition by the organic binder has a bulk density of 0.1 to 0.5 $g/cm^3$, when the organic binder is thermally decomposed, the monolith-holding element exhibits a thickness-restoring ratio of 2 to 10 times with opposite surfaces thereof kept in an open state, and a restoration surface pressure of the monolith-holding element kept under such a compressed condition that the thickness thereof is reduced to that corresponding to the clearance, is in the range of 0.5 to 30 $kg/cm^2$.

In a third aspect of the present invention, there is provided a process for producing a monolith-holding element for use in a catalytic converter comprising a cylindrical monolith supporting a catalyst for cleaning exhaust gases thereon, a metal casing accommodating the monolith and connected to exhaust pipes and the monolith-holding element fitted into a clearance between an outer peripheral surface of the monolith and an inner peripheral surface of the metal casing, which process comprises (I) the first step of impregnating an alumina fiber mat having a bulk density of 0.05 to 0.20 $g/cm^3$ with a solution containing an organic binder capable of being dissipated by thermal decomposition thereof, (II) the second step of compressing the alumina fiber mat impregnated with the organic binder-containing solution in the thickness direction so as to reduce a thickness thereof by ½ to ⅕ times, and (III) the third step of removing a solvent of the organic binder-containing solution while maintaining the thickness of the compressed alumina fiber mat, wherein when the organic binder is thermally decomposed, the monolith-holding element exhibits a thickness-restoring property with opposite surfaces thereof kept in an open state, and a restoration surface pressure of the monolith-holding element kept under such a compressed condition that the thickness thereof is reduced to that corresponding to the clearance, is in the range of 0.5 to 30 $kg/cm^2$.

In a fourth aspect of the present invention, there is provided a catalytic converter comprising a cylindrical monolith supporting a catalyst for cleaning exhaust gases thereon, a metal casing accommodating the monolith and connected to exhaust pipes and a monolith-holding element fitted into a clearance between an outer surface of the monolith and an inner surface of the metal casing, the monolith-holding element comprising a alumina fiber mat compressed in the thickness direction thereof and an organic binder uniformly dispersed in the alumina fiber mat and capable of being dissipated by thermal decomposition, the monolith-holding element being produced by a process comprising (I) the first step of impregnating the alumina fiber mat with a solution containing the organic binder, (II) the second step of compressing the alumina fiber mat impregnated with the organic binder-containing solution in the thickness direction, and (III) the third step of removing a solvent of the organic binder-containing solution while maintaining the thickness of the compressed alumina fiber mat, wherein the thickness of the monolith-holding element produced in the third step is 1 to 1.5 times the thickness of the alumina fiber mat compressed in the second step, and when the organic binder is thermally decomposed, the monolith-holding element exhibits a thickness-restoring property with opposite surfaces thereof kept in an open state, and a restoration surface pressure of the monolith-holding element whose opposite surfaces are kept in a fixed condition is in the range of 0.5 to 30 $kg/cm^2$.

In a fifth aspect of the present invention, there is provided a catalytic converter comprising a cylindrical monolith supporting a catalyst for cleaning exhaust gases thereon, a metal casing accommodating the monolith and connected to exhaust pipes and the monolith-holding element fitted into a clearance between an outer surface of the monolith and an inner surface of the metal casing, the monolith-holding element being prepared by compressing a alumina fiber mat having a bulk density of 0.05 to 0.20 $g/cm^3$ in the thickness direction thereof and containing an organic binder uniformly dispersed in the alumina fiber mat and capable of being dissipated by thermal decomposition, wherein the monolith-holding element is maintained in a compressed condition by the organic binder and has a bulk density of 0.1 to 0.5 $g/cm^3$, and when the organic binder is thermally decomposed, the monolith-holding element exhibits a thickness-restoring ratio of 2 to 10 times with opposite surfaces thereof kept in an open state, and a restoration surface pressure of the monolith-holding element whose opposite surfaces are kept in a fixed condition is in the range of 0.5 to 30 $kg/cm^2$.

In a sixth aspect of the present invention, there is provided a catalytic converter comprising a cylindrical monolith supporting a catalyst for cleaning exhaust gases thereon, a metal casing accommodating the monolith and connected to exhaust pipes and the monolith-holding element fitted into a clearance between an outer surface of the monolith and an inner surface of the metal casing, wherein the monolith comprises a ferrite-based stainless steel foil and provided with a honeycomb structure, the monolith is supported directly by the monolith-holding element comprising an alumina fiber mat compressed in the thickness direction and an organic binder uniformly dispersed in the alumina fiber mat and capable of being dissipated by thermal decomposition, and when the organic binder is thermally decomposed, a restoration surface pressure of the monolith-holding element being kept under such a compressed condition that the thickness thereof is reduced to that corresponding to the clearance, is in the range of 0.1 to 4.0 kg/cm².

In a seventh aspect of the present invention, there is provided a process for producing a catalytic converter comprising a cylindrical monolith supporting a catalyst for cleaning exhaust gases thereon, a cylindrical metal casing connected to exhaust pipes and a monolith-holding element fitted into a clearance between an outer surface of the monolith and an inner surface of the cylindrical metal casing, the monolith being composed of a ferrite-based stainless steel foils and having a honeycomb structure, which process comprises (I) the first step of winding the monolith-holding element around the outer peripheral surface of the cylindrical monolith, (II) the second step of, after accommodating the cylindrical monolith around which the monolith-holding element is wound, in the cylindrical metal casing having a two-piece structure composed of an upper shell member and a lower shell member, bringing the upper and lower shell members into mating contact with each other and connecting the upper and lower shell members together by welding mating peripheral portions thereof, wherein the said monolith-holding element comprises an alumina fiber mat compressed in the thickness direction and an organic binder uniformly dispersed in the alumina fiber mat, and when the organic binder is thermally decomposed, the restoration surface pressure of the monolith-holding element kept under such a compressed condition that the thickness thereof is reduced to that corresponding to the clearance, is in the range of 0.1 to 4.0 kg/cm².

In an eighth aspect of the present invention, there is provided a process for producing a catalytic converter, which comprises accommodating a cylindrical monolith supporting a catalyst for cleaning exhaust gases thereon, into a metal casing connected to exhaust pipes, and fitting a monolith-holding element into a clearance between an outer surface of the monolith and an inner surface of the metal casing, the monolith being composed of a ferrite-based stainless steel foil and having a honeycomb structure and being supported directly the monolith-holding element, the monolith-holding element being produced by a process comprising (I) the first step of impregnating the alumina fiber mat with a solution containing the organic binder, (II) the second step of compressing the alumina fiber mat impregnated with the organic binder-containing solution in the thickness direction, and (III) the third step of removing a solvent of the organic binder-containing solution while maintaining the thickness of the compressed alumina fiber mat, wherein when the organic binder is thermally decomposed, a restoration surface pressure of the monolith-holding element kept under such a compressed condition that the thickness thereof is reduced to that corresponding to the clearance, is in the range of 0.1 to 4.0 kg/cm².

The monolith-holding element, the process for the production of the monolith-holding element, the catalytic converter using the monolith and the process for the production of the catalytic converter in accordance with the present invention are described in detail below by referring to the accompanying drawings.

The monolith-holding element according to the present invention is applicable to the catalytic converter which comprises a monolith having a cylindrical shape and supporting a catalyst for cleaning exhaust gases thereon, a metal casing accommodating the monolith and connected to exhaust pipes, and the monolith-holding element fitted into a clearance formed between an outer peripheral surface of the monolith and an inner peripheral surface of the metal casing. The monolith-holding element can exhibit a thickness-restoring property due to the thermal decomposition of an organic binder contained therein when it is exposed to high-temperature exhaust gases from an internal combustion engine, upon which the monolith-holding element can exert a surface pressure onto the outer peripheral surface of the monolith and the inner peripheral surface of the metal casing, whereby the monolith is held in place within the metal casing.

The terminology used herein to explain the present invention are defined as follows.

The base mat means a mat composed of an alumina fiber, and the compressed mat means the base mat which is compressed in the thickness direction thereof. The mat used in the present invention is a non-woven fiber-like accumulated material composed of alumina fibers having approximately uniform thickness, and involves those called a blanket or a block.

The ordinary-state thickness represents a thickness of the base mat which is free from a compression force in its thickness direction (thickness (A) shown in FIG. 3(a)).

The compressed thickness represents a thickness of the compressed mat (thickness (B) shown in FIG. 3(b)).

The ordinary-state thickness of the monolith-holding element represents the thickness of the monolith-holding element (molded product) before mounted to the catalytic converter (thickness (C) shown in FIG. 3(c)).

The clearance represents a space defined between the outer peripheral surface of the monolith and the inner peripheral surface of the metal casing (reference numeral (D) in FIG. 3(d)).

Incidentally, the monolith-holding element is hereinafter referred to merely as a "holder".

First, the holder according to the first aspect of the present invention is explained by referring to FIG. 3.

In FIG. 3, the afore-mentioned holder represented by reference numeral 3 comprises the compressed mat and the organic binder uniformly dispersed in the compressed mat and capable of being dissipated from the mat by the thermal decomposition thereof. The process for the production of the holder comprises (I) the first step of impregnating the base mat with a solution containing the organic binder, (II) the second step of compressing the base mat impregnated with the organic binder-containing solution in its thickness direction, and (III) the third step of removing a solvent of the organic binder-containing solution while maintaining the thickness (B) of the compressed base mat, in which the thickness (C) of the holder 3 obtained in the third step is 1 to 1.5 times the compressed thickness (B) of the compressed mat obtained in the second step, the mat can exhibit a thickness-restoring property with the opposite surfaces thereof being kept in an open state when the organic binder contained in the mat is thermally decomposed, and the surface pressure of the holder under such a compressed condition that the holder has a thickness corresponding to the clearance, is in the range of 0.5 to 30 kg/cm$^2$. The compressed condition in which the holder has a thickness corresponding to the clearance, is hereinafter referred to merely as "fixed condition of opposite surfaces."

The alumina fiber constituting the base mat is selected from fibers capable of exhibiting the thickness-restoring property when the mat is in the form of the compressed mat, that is, those capable of exhibiting a resiliency against the compression force in the thickness direction of the mat. The alumina fiber has generally a fiber diameter of 1 to 50 μm and a fiber length of 0.5 to 500 mm, preferably a fiber diameter of 1 to 10 μm and a fiber length of 0.5 to 300 mm.

Typical examples of the alumina fiber are an alumina/silica-based crystalline short fiber having a silica content of not more than 5% by weight, namely an alumina content of not less than 95% by weight, and other ordinarily used alumina fibers containing 70 to 95% by weight of alumina and the remainder consisting of silica. Especially, mullite fibers containing 72% by weight of alumina is preferred, because it is excellent in a high-temperature stability and an elasticity.

The afore-mentioned alumina/silica-based polycrystalline fiber generally called as an alumina fiber, is superior in heat resistance to an amorphous ceramic fiber which has been used in the condition where a maximum temperature is approximately 1,200° C., and therefore, can withstand a temperature of 1,500 to 1,600° C. which is high enough as compared with that of exhaust gases from the internal combustion engine. Besides, the compressed mat composed of the alumina fiber has a sufficient elasticity and is considerably reduced in heat deterioration such as softening and shrinking observed in the case of the ceramic fiber, thereby providing a holder 3 having a low deterioration with the passage of time.

The base mat may be made of a single kind of the afore-mentioned alumina fibers or a mixture of any two or more kinds of the alumina fibers. Further, the base mat may be of a laminate comprising a plurality of identical or different mats each made of a single kind of alumina fibers. The bulk density of the base mat is generally in the range of 0.05 to 0.2 g/cm$^3$, preferably 0.05 to 0.15 g/cm$^3$. When the bulk density of the base mat is less than 0.05 g/cm$^3$, the compression ratio becomes large. On the other hand, when the bulk density of the base mat is more than 0.2 g/cm$^3$, the holder often exhibits an insufficient thickness-restoring force.

The holder 3 according to the present invention contains an organic binder uniformly dispersed in the mat compressed in its thickness direction. The bonding force of the organic binder suppresses the restoration to its original thickness.

As the organic binder, any binders composed of an organic compound can be usable in the present invention without particular limitations, as far as the binders can maintain the compressed thickness (B) of the compressed mat at an ordinary temperature, and the thermal decomposition thereof permits restoration of the original thickness of the mat. It is preferred that the organic binder be readily thermally decomposed and dissipated (destroyed) from the mat at a temperature at which the holder 3 is intended to be used. However, if the organic binder no longer has a function as a binder at the intended temperature to cause the holder to restore its original thickness, it is not necessary that the organic binder is dissipated from the mat by the thermal decomposition. Further, since the holder 3 is exposed generally to a temperature of not less than 600° C. or to a temperature of 900 to 1,000° C. for a high-temperature use, it is preferred that the organic binder be thermally decomposed for a short period of time so as to lose its function as a binder at a temperature of about 600° C. or lower. More preferably, the organic binder is dissipated at the temperature range from the mat upon the thermal decomposition.

As the organic binders, various rubbers, water-soluble polymer compounds, thermoplastic resins, thermosetting resins or the like are exemplified. Examples of the rubbers include natural rubbers; acrylic rubbers such as copolymers of ethyl acrylate and chloroethyl-vinyl ether, copolymers of n-butyl acrylate and acrylonitrile or the like; nitrile rubbers such as copolymers of butadiene and acrylonitrile or the like; butadiene rubbers or the like. Examples of the water-soluble polymer compounds include carboxymethyl cellulose, polyvinyl alcohol or the like. Examples of the thermoplastic resins include acrylic resins in the form of homopolymers or copolymers of acrylic acid, acrylic acid esters, acrylamide, acrylonitrile, methacrylic acid, methacrylic acid esters or the like; an acrylonitrile-styrene copolymer; an acrylonitrile-butadiene-styrene copolymer or the like. Examples of the thermosetting resins include bisphenol-type epoxy resins, novolac-type epoxy resins or the like.

The afore-mentioned organic binders may be used in the form of an aqueous solution, a water-dispersed emulsion, a latex or a solution using an organic solvent. These organic binders are hereinafter referred to generally as a "binder liquid".

As the afore-mentioned binder liquid, commercially available binders can be used as such or in the form of a solution diluted with water or the like. Incidentally, the organic binders are not necessarily used singly, but the mixture of any two or more thereof can be also used.

Among the afore-mentioned organic binders, the compounds selected from the group consisting of synthetic rubbers such as acrylic rubbers, nitrile rubbers or the like; water-soluble polymer compounds such as carboxymethyl cellulose, polyvinyl alcohol or the like; and acrylic resins are preferable. Among them, acrylic rubbers, nitrile rubbers, carboxymethyl cellulose, polyvinyl alcohol, acrylic resins other than the acrylic rubbers are particularly preferred. These organic binders are readily available and can be readily treated or handled during the preparation of the binder liquid and the impregnation of the binder liquid into the compressed mat. Further, these organic binders not only can exhibit a sufficient thickness-retaining force even at a relatively low content thereof, but also can be easily thermally decomposed under the intended temperature condition, thereby providing the holder 3 having an excellent flexibility and a high mechanical strength.

The content of the organic binder in the compressed mat is not particularly restricted but may be appropriately determined depending upon a kind of the fiber used in the compressed mat, the compressed thickness (B) of the compressed mat, a resiliency of the compressed mat against the compression force applied thereto or the like. The content is generally in the range of 10 to 30 parts by weight (on the solid basis) based on 100 parts by weight of the alumina fiber. When the content of the organic binder in the compressed mat is less than 10 parts by weight, it is difficult to maintain the compressed thickness (B) of the compressed mat. However, in order to maintain the compressed thickness (B) of the compressed mat, it is not necessary that the content of the organic binder contained in the mat exceeds 30 parts by weight. When the content of the organic binder is too high, not only the production cost of the holder is increased, but also it becomes difficult to thermally decompose an entire amount of the organic binder. From this viewpoint, the content of the organic binder in the compressed mat is preferably in the range of 15 to 25 parts by weight.

The holder 3 according to the present invention may be produced by the process comprising (I) the first step of impregnating the base mat with the organic binder, (II) the second step of compressing the base mat impregnated with a solution containing the organic binder in its thickness direction, and (III) the third step of removing a solvent of the organic binder-containing solution while maintaining the compressed thickness (B) of the compressed base mat. It is preferred that the ordinary-state thickness (A) of the base mat used in the first step is 2 to 10 times the thickness (C) of the holder 3.

The compressed thickness (B) of the compressed mat obtained in the second step may be determined depending upon the thickness-restoring property, the resiliency against the compression force applied, the surface pressure for restoration to the aimed holder 3, the gas sealing properties or the like. In order to accomplish the afore-mentioned restoration ratio, the ratio of the compressed thickness (B) of the compressed mat to the ordinary-state thickness (A) of the base mat is generally about 1/1.25 or less, preferably 1/2 to 1/15. Further, the thickness (C) of the holder 3 obtained in the third step is 1 to 1.5 times the compressed thickness (B) of the compressed mat obtained in the second step. Incidentally, the details of the respective steps are described below in explaining the process of the production of the holder 3 according to the third aspect of the present invention.

As will be understood from the afore-mentioned description, in the holder 3 according to the present invention, the specific material, the specific ordinary-state thickness (A) or the like of the base mat may be determined according to the elasticity in the thickness direction, the clearance (D) of the catalytic converter, the surface pressure for restoration to the aimed holder 3, the gas sealing properties or the like.

The thus-constructed holder 3 according to the present invention can exhibit a thickness-restoring property with the opposite surfaces kept in an open state, when the organic binder contained therein is thermally decomposed. In the case where the opposite surfaces of the holder is maintained in the fixed condition, the restoration surface pressure at the opposite surfaces is adjusted to 0.5 to 30 kg/cm$^2$, preferably 0.5 to 8 kg/cm$^2$.

The restoration surface pressure of the holder 3 cannot be directly measured after the holder is mounted to the catalytic converter, and therefore, may be determined from a value for the molded product measured before mounting to the catalytic converter. Such a restoration surface pressure can be measured by one of the methods set forth below.

(1) Direct method in which one surface of the molded product bears against a stationary face plate and the other surface thereof is brought into contact with a measuring face plate, and thereafter, the organic binder contained in the molded product is thermally decomposed while maintaining the contact of both the surfaces with the face plates, upon which a surface pressure on the measuring face plate is directly measured.

(2) Indirect method in which after the organic binder contained in the molded product is thermally decomposed with the opposite surfaces kept in an open state to permit the molded product to be restored, the molded product is compressed by means of a face plate until reaching the thickness (C) before the thermal decomposition, upon which a pressure applied onto the face plate to conduct the compression is measured as a restoration surface pressure of the holder.

Among the afore-mentioned two methods, the latter indirect method is preferred because of its simplicity. In Examples described later of the present invention, a compression force required for the production of the compressed mat is used as an index for representing the restoration surface pressure.

The reason why the restoration surface pressure of the holder is adjusted to the afore-mentioned range is as follows. That is, when the restoration surface pressure is less than 0.5 kg/cm$^2$, there is a likelihood that the monolith 1 is not surely secured to the metal casing. On the other hand, the restoration surface pressure more than 30 kg/cm$^2$ is not necessary for the fixing of the monolith 1. The restoration surface pressure within the afore-mentioned range does not pose any problem to achieve a good gas sealing properties around an outer periphery of the monolith 1.

The restoring property of the holder can be also determined by the ratio of the thickness of the holder 3, which is obtained after the thermal decomposition of the organic binder when the opposite surfaces thereof is kept in an open state, to the thickness (C) thereof, i.e., a thickness-restoring ratio with the opposite surfaces kept in an open state. Such a thickness-restoring ratio is preferably in the range of 2 to 10 times.

When the thicknesses of the holder before and after the thermal decomposition of the organic binder are represented by $d_0$ mm and d mm respectively, the thickness-restoring ratio of the holder 3 is defined by the following formula (I):

$$\text{Thickness-restoring ratio} = d/d_0 \quad (I)$$

Further, the holder 3 of the present invention which is constructed of the afore-mentioned material, has a bulk density of 0.1 to 0.5 g/cm$^3$, preferably 0.2 to 0.4 g/cm$^3$. Furthermore, the holder preferably has a unit tensile strength of 10 to 40 kg/cm$^2$ and a tensile modulus of 200 to 700 kg/cm$^2$.

The holder 3 having the afore-mentioned properties can securely hold the monolith without buckling when mounted to the catalytic converter, because of its restoration surface pressure exhibited after the thermal decomposition.

The thickness (C) of the holder 3 according to the present invention may be determined depending upon the clearance (D) of the catalytic converter. In general, in the case where the clearance (D) is from 2 to 8 mm, preferably from 3 to 6 mm, it is suitable that the thickness (C) of the corresponding holder 3 is in the range of 3 to 10 mm. The thickness of the holder 3 is 1.0 to 2.0 times, preferably 1.0 to 1.6 times the clearance (D).

Next, the holder according to the second aspect of the present invention is described by referring to FIG. 3.

In FIG. 3, the holder represented by reference numeral 3 is composed of the base mat compressed in the thickness direction and the organic binder uniformly dispersed in the base mat, and capable of dissipating upon the thermal decomposition thereof. The holder is maintained in a compressed state by the organic binder, and has a bulk density of 0.1 to 0.5 g/cm$^3$, a thickness-restoring ratio of 2 to 10 times when the organic binder is thermally decomposed while keeping the opposite surfaces of the holder in an open state, and a restoration surface pressure of 0.5 to 30 kg/cm$^2$ when the opposite surfaces are kept in the fixed condition.

The afore-mentioned holder 3 may be made of the same base material as that used for the holder 3 according to the first aspect of the present invention. In addition, the holder can be also produced, for example, by the same process as that used for the holder according to the first aspect of the present invention. In this case, it is important that the holder 3 is maintained in a compressed state by the organic binder, and has a bulk density of 0.1 to 0.5 g/cm$^3$, a thickness-restoring ratio of 1.25 to 10 times when the organic binder is thermally decomposed while keeping the opposite surfaces in an open state, and a restoration surface pressure of 0.5 to 30 kg/cm$^2$ when the opposite surfaces are kept in the fixed condition.

It is preferred that other properties of the holder 3 is the same as those of the holder 3 according to the first aspect of the present invention. Specifically, the ordinary-state thickness (A) of the base mat is preferably 2 to 10 times the thickness (C) of the holder 3. In addition, the organic binder is preferably made of at least one material selected from the group consisting of acrylic rubbers, nitrile rubbers, carboxymethyl cellulose, polyvinyl alcohol and acrylic resins other than the acrylic rubbers. The content of the organic binder is preferably 10 to 30 parts by weight based on 100 parts by weight of the alumina fiber mat. Further, similarly to the holder according to the first aspect of the present invention, the holder preferably has a restoring surface pressure of 0.5 to 8 kg/cm$^2$ when the opposite surfaces of the holder is kept in the fixed condition, a unit tensile strength of 10 to 40 kg/cm$^2$ and a tensile modulus of 200 to 700 kg/cm$^2$.

Next, the process for producing the holder according to the third aspect of the present invention, is described by referring to FIG. 3.

The afore-mentioned process comprises (I) the first step of impregnating a base mat having a bulk density of 0.05 to 0.2 g/cm$^3$, preferably 0.05 to 0.15 g/cm$^3$, with a solution containing an organic binder capable of dissipating by the thermal decomposition thereof, (II) the second step of compressing the base mat impregnated with the organic binder-containing solution in its thickness direction to form a compressed base mat having a thickness ½ to ⅕ time that of the base mat, and (III) the third step of removing a solvent of the organic binder-containing solution while maintaining the thickness (B) of the compressed base mat, wherein the holder 3 has a thickness-restoring property when the organic binder is thermally decomposed while keeping the opposite surfaces of the mat in an open state, and a restoration surface pressure of 0.5 to 30 kg/cm$^2$ when the opposite surfaces are kept in the fixed condition.

In the afore-mentioned process, the same base mat and organic binder solution as those described above can be used.

In the afore-mentioned first step, the base mat is impregnated with the organic binder solution.

The base mat has a bulk density of 0.05 to 0.2 g/cm$^3$, preferably 0.05 to 0.15 g/cm$^3$, and the same ordinary-state thickness as that described above. Also, the organic binder solution is suitably used in the form of an aqueous solution, an aqueous dispersion-type emulsion, a latex or a solution using an organic solvent, which contain as effective components, acrylic rubbers, nitrile rubbers, carboxymethyl cellulose, polyvinyl alcohol or acrylic resins. The concentration of the organic binder in the solution may be adequately determined depending upon the method of impregnating the organic binder solution into the base mat, the amount of the organic binder to be retained in the mat or the like, but is generally in the range of 2 to 50% by weight.

As the method for impregnating the organic binder solution into the base mat, there can be used a method of immersing the base mat in the organic solution or a method of spraying the organic binder solution onto the base mat. In the case where the base mat to be treated has a large ordinary-state thickness (A), it is preferable to use the immersing method. On the other hand, in the case where the base mat to be treated has a small ordinary-state thickness (A), it is preferred to use the spraying method. In the case the impregnation is conducted by the spraying method, the organic binder solution of an emulsion-type exhibiting little stringing phenomenon is suitably used.

Alternatively, the impregnation of the base mat can be carried out by dispersing and suspending bulky alumina fiber used as a starting material in an organic binder solution and then collecting the suspended alumina fiber on a screen plate or a porous plate by filtering or paper-making techniques to form a flat accumulated material of the alumina fiber thereon. In this method, the alumina fiber is apt to be cut during the dispersion and suspension, so that the care must be taken in the dispersing and suspending operations. Therefore, it is preferred that the organic binder solution used has a low viscosity.

In the afore-mentioned second step, the base mat impregnated with the organic binder solution is compressed in the thickness direction thereof, thereby determining the thickness (C) of the aimed holder 3 and controlling the content of the organic binder in the holder.

As the compressing means, press plates or press rollers can be used to press the base mat. The press plate may comprise two liquid-permeable plate members. Typical examples of the press plates include punching metals, resin nets, metal nets (meshes), porous plates, air-permeable plates or the like. These compressing means are preferably used in combination with a means for absorbing the binder solution. Further, the compressing method is preferably carried out in combination with a centrifugal liquid-removing method. Specifically, the removal of liquid from a surface of the compressed mat is promoted to prevent the organic binder from being heterogeneously distributed thereon and concentratedly located on the surface thereof. This results in effectively preventing various inconveniences due to the use of the organic binder, for example, adherence of the binder to an drying apparatus used for removal (drying) of the solvent in the subsequent third step, or the like.

In the afore-mentioned third step, the solvent contained in the organic binder solution is removed while maintaining the compressed thickness (B) of the compressed mat obtained in the second step, to prevent the compressed mat from temporarily restoring its thickness in undried state thereof and avoid the organic binder from being heterogeneously distributed therein and concentratedly located on the surface thereof.

It is preferred that the third step is rapidly carried out by supplying a hot air under such a temperature condition that the organic binder is not caused to be degraded and decomposed. This is because the organic binder contained in the organic binder solution is prevented from being precipitated, thereby further avoiding the biased distribution of the organic binder in the mat. As a result, the holder 3 having a large restoration surface pressure can be obtained.

Similarly to the holder according to the second aspect of the present invention, it is required that the holder 3 according to the third aspect of the present invention exhibits a thickness-restoring property in an open state of the opposite surfaces thereof when the organic binder is subjected to thermal decomposition, and has a restoration surface pressure of 0.5 to 30 kg/cm², preferably 0.5 to 8 kg/cm² when the opposite surfaces thereof are kept in the fixed condition. Further, the other properties of the holder 3 according to the third aspect of the present invention preferably are the same as those of the holders 3 according to the first and second aspects of the present invention.

Figure 2:
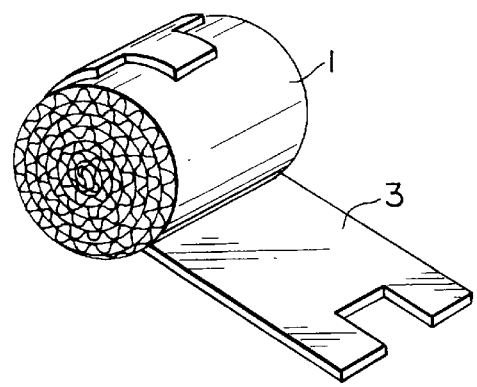
FIG. 2 is a perspective view showing a manner in which a monolith-holding element is wound around a monolith.

Next, the catalytic converter according to the fourth aspect of the present invention is described by referring to FIGS. 1 to 3.

The catalytic converter shown in FIG. 1 comprises a monolith 1 of a cylindrical shape for supporting a catalyst for cleaning exhaust gases thereon, a metal casing 2 accommodating the monolith and connected to exhaust pipes and a holder 3 inserted into a clearance (D) between an outer surface of the monolith 1 and an inner surface of the metal casing 2. The holder 3 is composed of a base mat compressed in the thickness direction thereof and an organic binder uniformly dispersed in the base mat and capable of being dissipated when subjected to thermal decomposition. The process for the production of the holder 3 comprises (I) the first step of impregnating the base mat with the organic binder solution, (II) the second step of compressing the base mat impregnated with the organic binder solution in its thickness direction to a thickness (B), and (III) the third step of removing a solvent of the organic binder solution while maintaining the ordinary-state thickness (B) of the compressed base mat, wherein the thickness (C) of the holder 3 obtained in the third step is 1 to 1.5 times the compressed thickness (B) of the compressed base mat obtained in the second step, and when the organic binder is subjected to thermal decomposition, the holder 3 exhibits a thickness-restoring property in an open state of the opposite surfaces thereof and has a restoration surface pressure of 0.5 to 30 kg/cm² in a fixed condition of the opposite surfaces.

Incidentally, in the illustrated catalytic converter, the monolith 1 having a honeycomb structure is used as a preferred embodiment thereof. In the figures, reference numeral 2a denotes an upper shell member of the metal casing; reference numeral 21a denotes a flange portion of the upper shell member 2a; reference numeral 2b denotes a lower shell member of the metal casing; reference numeral 21b denotes a flange portion of the lower shell member 2b; reference numerals 22a and 22b denote bolt holes for fixing the catalytic converter onto a vehicle body such as chassis; and reference numerals 4 and 5 denote openings at which the catalytic converter is coupled with exhaust pipes.

The holder 3 used in the catalytic converter according to the fourth aspect of the present invention, may be the same as the holders 3 according to the first and second aspects, which can be obtained according to the third aspect of the present invention. Especially, in the afore-mentioned catalytic converter, the ordinary-state thickness (A) of the base mat is preferably 2 to 10 times the thickness (C) of the holder 3.

The catalytic converter according to the fourth aspect of the present invention comprises a monolith 1 of a cylindrical shape for supporting a catalyst for cleaning exhaust gases thereon, a metal casing 2 accommodating the monolith and connected to exhaust pipes and a holder 3 inserted into a clearance (D) between an outer surface of the monolith 1 and an inner surface of the metal casing 2.

In the afore-mentioned catalytic converter, it is not required that the holder 3 has the same thickness as the clearance (D), but the holder having a slightly larger thickness than the clearance (D) can be also mounted thereinto. However, when the thickness of the holder is too large or when the holder is less slidable on the metal casing, there arises such an inconvenience that the holder projects outwardly and is interposed between mating surfaces of the flange portions 21a and 21b, so that the mating surfaces cannot be welded to each other. In consequence, the thickness (C) of the holder 3 is preferably 1.0 to 2.0 times the clearance (D) of the catalytic converter. In addition, since there is a likelihood that the compressed mat obtained in the second step cannot exhibit a sufficient restoring force due to compression hysteresis, it is preferred that the compressed thickness (B) of the compressed mat is larger than the clearance (D).

Further, it is preferred that when mounted to the catalytic converter, the holder 3 has an initial bulk density of 0.18 to 0.8 g/cm³, preferably 0.2 to 0.6 g/cm³, and an initial surface pressure of 0 to 8 kg/cm². In addition, the restoration surface pressure of the holder 3 in the clearance (D) is preferably in the range of 0.5 to 8 kg/cm² upon the thermal decomposition of the organic binder, which amounts to 50 to 90% or 110 to 150% of the initial surface pressure.

In the catalytic converter illustrated in the figures, the metal casing 2 has a two-piece clamshell structure comprising the upper half shell member 2a and the lower half shell member 2b which are integrally connected with each other. The upper and lower shell members 2a and 2b are provided with the flange portions 21a and 21b, respectively, which function as mating surfaces when the upper and lower shell members are connected to each other by welding. Further, the lower shell member 2b of the metal casing is provided with openings 4 and 5 for connecting the catalytic converter with exhaust pipes. Alternatively, a casing of a stuffing box structure, which is preliminarily formed into a cylinder so as to accommodate the monolith 1 therein, can be also used as the metal casing 2.

The metal casing 2 has an inner diameter larger than an outer diameter of the monolith 1 such that the clearance (D) of about 3 to about 6 mm, usually about 4 mm, is formed therebetween to ensure the insertion of the holder 3. The holder 3 has the thickness (C) which is 1.0 to 2.0 times, preferably 1.0 to 1.6 times the clearance (D), and is mounted over an entire outer peripheral surface of the monolith 1. However, it is not necessarily required that the holder 3 extends over the entire outer peripheral surface. Instead, a strip-shaped holder can be mounted only around longitudinally-center portion of the outer peripheral surface of the monolith or two strip-shaped holders can be mounted around opposite ends of the outer peripheral surface of the monolith. Further, a ceramic fiber mat made of alumina/silica-based fiber having a lower heat resistance than that of the alumina fiber can be used together with the holder according to the present invention, such that the ceramic fiber mat placed on the side of the low-temperature metal casing is laminated over the holder placed on the side of the honeycomb monolith.

The afore-mentioned catalytic converter can be basically produced according to the below-mentioned process for the production of a catalytic converter according to the seventh aspect of the present invention.

Next, the catalytic converter according to the fifth aspect of the present invention is described by referring to FIGS. 1 to 3.

The catalytic converter according to the fifth aspect of the present invention is substantially the same as that according to the fourth aspect of the present invention except that the production method for the holder used therein is not limited to particular ones. In the afore-mentioned catalytic converter, the holder 3 may be produced by compressing a base mat having a bulk density of 0.05 to 0.2 g/cm³, preferably 0.05 to 0.15 g/cm³, in its thickness direction. The organic binder capable of being dissipated by thermal decomposition is uniformly dispersed in the compressed mat, whereby the compressed mat is maintained in a compressed state and has a bulk density of 0.1 to 0.5 g/cm³, preferably 0.2 to 0.4 g/cm³. When the organic binder is thermally decomposed, the holder exhibits a thickness-restoring ratio of 2 to 10 times in an open state of the opposite surface thereof and a restoration surface pressure of 0.5 to 30 kg/cm² in a fixed condition of the opposite surfaces thereof.

The afore-mentioned catalytic converter comprises a monolith 1 of a cylindrical shape for supporting a catalyst for cleaning exhaust gases thereon, a metal casing 2 accommodating the monolith and connected to exhaust pipes and the holder 3 inserted into a clearance (D) between an outer surface of the monolith 1 and an inner surface of the metal casing 2. In this case, the holder 3 has the thickness (C) which is 1.0 to 2.0 times the clearance (D) formed between the outer surface of the monolith 1 and the inner surface of the metal casing 2. Further, when mounted to the catalytic converter, the holder has an initial bulk density of 0.18 to 0.8 g/cm³, preferably 0.2 to 0.6 g/cm³, an initial surface pressure of 0 to 8 kg/cm². When the organic binder is thermally decomposed, the restoration surface pressure of the holder 3 mounted in the clearance (D) is in the range of 0.5 to 8 kg/cm², which amounts to 50 to 90% or 110 to 150% of the initial surface pressure.

The afore-mentioned catalytic converter can be basically produced according to the below-mentioned process for the production of the catalytic converter according to the seventh aspect of the present invention.

Next, the catalytic converter according to the sixth aspect of the present invention is described by referring to FIGS. 1 to 3.

The afore-mentioned catalytic converter comprises a metal monolith 1 of a cylindrical shape for supporting a catalyst for cleaning exhaust gases thereon, a metal casing 2 accommodating the monolith and connected to exhaust pipes, and a holder 3 inserted into a clearance (D) between an outer surface of the monolith 1 and an inner surface of the metal casing 2. The monolith 1 which may be made of a ferrite-based stainless steel foil and have a honeycomb structure, is supported directly by the holder 3 produced by uniformly dispersing the organic binder capable of being dissipated by thermal decomposition in the base mat compressed in its thickness direction. When the afore-mentioned holder 3 is kept in such a compressed condition that the thickness of the holder corresponds to the clearance (D) between the outer peripheral surface of the monolith 1 and the inner peripheral surface of the metal casing 2 and when the organic binder is thermally decomposed, the holder exhibits a restoration surface pressure of 0.1 to 4.0 kg/cm².

The catalytic converter of the afore-mentioned arrangement, which comprises the metal monolith 1 of a cylindrical shape for supporting a catalyst for cleaning exhaust gases thereon, the metal casing 2 accommodating the monolith and connected to exhaust pipes and the holder 3 inserted into a clearance (D) between an outer surface of the monolith 1 and an inner surface of the metal casing 2, has substantially the same arrangement as that according to the fourth aspect of the present invention except for such limitations that the monolith 1 is made of the specific metal and has the honeycomb structure.

One of the features of the present invention resides in the use of the specific holder 3. That is, as described above, the crystalline alumina fiber mat (base mat) used in the catalytic converter according to the present invention has been disclosed in Japanese Patent Application Laid-open (Kokai) No. 7-127443 (1995) in which the crystalline alumina fiber mat is used as a holder for a ceramic honeycomb catalyst (monolith). In this case, since the ceramic monolith exhibits a low heat expansion as compared to the metal casing and the metal casing has a high coefficient of thermal expansion, a clearance therebetween becomes large, so that the holder composed of the crystalline alumina fiber mat cannot provide sufficient supporting effects.

On the other hand, even if the ceramic monolith is simply replaced with the monolith composed especially of the ferrite-based stainless steel foil, the clearance between the monolith and the metal casing becomes considerably small so that the monolith is caused to be buckled. On the contrary, in accordance with the present invention, as a material of the holder 3, there can be used the specific crystalline alumina mat having a restoration surface pressure as low as 0.1 to 0.4 kg/cm² when compressed so as to reduce the thickness to that corresponding to the clearance, whereby the holder can successfully exhibit sufficient supporting effects without the buckling of the monolith 1.

Another feature of the present invention resides in that the monolith 1 is supported directly by the holder 3 composed of a crystalline alumina mat. That is, in the case where such an arrangement in which a metal ring having a short axial length is fitted on an outer peripheral surface of a metal monolith, is adopted like the cleaning apparatus as disclosed in Japanese Patent Application Laid-open (Kokai) No. 6-126191 (1994), the buckling of the metal monolith is likely to occur due to a tightening force temporarily exerted by the metal ring onto the metal monolith having a large coefficient of thermal expansion. On the other hand, in accordance with the present invention, such a structure in which the monolith 1 is supported directly by the holder 3 composed of the crystalline alumina fiber mat, is adopted so as not to limit the thermal expansion of the metal monolith.

The structure of the metal casing 2 in the afore-mentioned catalytic converter is substantially the same as that of the catalytic converter according to the fourth aspect of the present invention.

The monolith 1 may be made of a metal foil material. Such a metal foil material may be selected from those exhibiting low deterioration when subjected to a high-temperature heat cycle such as high-temperature oxidation, low thermal expansion and the like, a good compatibility with the catalyst and a coating material used to carry the catalyst thereon, and low thermal degradation after the catalyst is carried thereon. In general, ferrite-based stainless steel foils composed substantially of Fe, Cr and Al or Si and having a low coefficient of thermal expansion may be suitably used as the metal foil material.

The content of Cr contained in the stainless steel foil is generally about 20 wt %. Although a small content of Al is preferred, Al may be generally added in an amount of about 5 wt % in view of its oxidation resistance. In addition, a small amount of other metals such as La, Ce, Y, Ti or the like may be also added to the stainless steel foil. The thickness of the stainless steel foil is preferably as small as possible to attain a low pressure loss or a good temperature-rise characteristic. The thickness of the stainless steel foil is generally not more than 100 μm which is thinner than the thickness of ceramic monolith, but preferably not less than 20 μm in view of its oxidation resistance.

The monolith 1 may have a laminated structure comprising a flat sheet and a corrugated sheet both made of the afore-mentioned stainless steel foil. Specifically, the monolith may be formed into a honeycomb structure produced by alternately laminating the flat sheets and the corrugated sheets, bonding these sheets with each other so as to withstand a high-temperature heat cycle and rolling the laminated material into a cylindrical shape, or by alternately laminating the flat sheets and the corrugated sheets, and winding and bonding these sheets to form a cylindrical material. Any bonding methods such as brazing, diffusion-welding or the like can be used for the production of the monolith 1. The thus-prepared monolith 1 is coated with an alumina coat layer and then carries thereon a noble metal layer such as Pt, Ph or the like, thereby imparting a function as a catalyst thereto.

In the afore-mentioned catalytic converter, the holder 3 may be a molded product composed of the non-expansive compressed mat and the organic binder uniformly impregnated into the compressed mat and capable of being dissipated by thermal decomposition. It is important that the compressed mat has a restoration surface pressure of 0.1 to 4.0 kg/cm$^2$, preferably 0.1 to 2.5 kg/cm$^2$, when the opposite surfaces thereof is in such a compressed or fixed condition that it has a thickness corresponding to the clearance (D). The restoration surface pressure can be exhibited only after the organic binder uniformly dispersed in the compressed mat is dissipated by thermal decomposition thereof, so that the molded product can follow changes in size of the clearance (D) caused by the changes in temperatures of the monolith 1 and the metal casing 2, whereby the monolith 1 can be elastically supported directly by the molded product.

The crystalline alumina fiber mat is excellent in heat resistance as compared with non-crystalline ceramic fiber made of the same alumina/silica-based material and limits a heat deterioration such as softening or shrinkage to an extremely low level, similarly to the ceramic fiber. Consequently, if the crystalline alumina fiber is used, there can be obtained a compressed mat having an excellent elasticity. That is, such a compressed mat can exhibit excellent properties such as a low bulk density, a high capability for retaining the catalyst and a low temperature change. Accordingly, even when the clearance (D) is narrowed so that the bulk density of the compressed mat is rapidly increased, it is prevented to rapidly increase the retaining pressure exerted on the monolith 1. This indicates that the crystalline alumina fiber is an optimum material of the holder for the metal monolith.

Besides, since the afore-mentioned compressed mat shows a low temperature-dependency of the capability for retaining the catalyst, other kinds of holders such as metal rings, metal nets or the like as used in conventional apparatuses are not necessary to effectively support the monolith without buckling thereof. Further, owing to the afore-mentioned inherent properties of the fiber itself, the compressed mat has such a feature that fly-off of the fiber is limited to a low level when exposed to high-temperature exhaust gases. Accordingly, from such a viewpoint, the crystalline alumina fiber can provide an excellent fiber applicable to the compressed mat for the holder 3.

In the afore-mentioned catalytic converter, the thickness (B) of the compressed mat may be determined depending upon its elasticity, the clearance (D), its thermally-changing amounts, its gas-sealing properties and a buckling strength of the monolith 1. In this case, it is required that the thickness of the compressed mat is selectively determined so as to show a compressing force of 0.1 to 4.0 kg/cm$^2$, when compressed so as to reduce the thickness to that corresponding to the clearance (D). In general, the molded product composed of the compressed mat having a ratio of its thickness to the ordinary-state thickness (A) of the base mat of not more than $1/1.25$, preferably in the range of $1/2$ to $1/8$, and the organic binder can satisfy the requirement of the afore-mentioned compressing force after the organic binder is dissipated by thermal decomposition.

The holder used in the catalytic converter according to the sixth aspect of the present invention can be produced by the process according to the third aspect of the present invention. The catalytic converter can be substantially produced according to the below-mentioned process for the production of the catalytic converter according to the seventh aspect of the present invention.

In the afore-mentioned catalytic converter, the thickness (C) of the holder 3 (molded product) before mounting thereto is preferably 1.0 to 1.7 times the clearance (D). The bulk density of the holder 3 is preferably as low as possible from the standpoint of preventing the buckling of the monolith 1 at a high temperature. However, when the bulk density is too low, the holder shows deteriorated capability for retaining the catalyst thereon. Accordingly, the bulk density of the holder 3 should be adjusted to an appropriate value. Specifically, it is preferred that the bulk density of the holder 3 before mounting to the catalytic converter be not more than 0.45 g/cm$^3$ in the case where the foil thickness of the monolith 1 is in the range of 60 to 100 $\mu$m, and not more than 0.2 g/cm$^3$ in the case where the foil thickness of the monolith 1 is in the range of 20 to 50 $\mu$m. The lower limit of such a bulk density is preferably adjusted to not less than 0.06 g/cm$^3$ so as not to cause removal of the monolith 1 when subjected to high-temperature heat cycle experiments. Further, the bulk density of the holder when mounted to the clearance (D) is preferably in the range of 0.10 to 0.45 g/cm$^3$.

In the afore-mentioned catalytic converter, the initial surface pressure of the holder 3 when mounted thereto is preferably in the range of 0 to 0.45 kg/cm$^3$. It is especially preferred that the restoration surface pressure of the holder 3 received in the clearance (D) upon the thermal decomposition of the organic binder may be in the range of 0.1 to 4 kg/cm$^2$, and may range from 50 to 90% of the initial surface pressure of the holder mounted to the catalytic converter. Under such conditions, the clearance is narrowed and the surface pressure of the holder is temporarily increased. Once the organic binder is thermally decomposed, the surface pressure is decreased so that the monolith is effectively prevented from being buckled. When the organic binder is thermally decomposed, the restoration surface pressure of the holder 3 may be in the range of 0.1 to 4 kg/cm$^2$, and may range from 110 to 150% of the initial surface pressure of the holder mounted to the catalytic converter. The thickness-restoring ratio of the holder 3 is preferably in the range of 1.25 to 8. It is preferred that the holder 3 has a tensile strength of 1 to 30 kg/cm$^2$, and a tensile modulus of 150 to 600 kg/cm$^2$.

In the afore-mentioned catalytic converter, the holder 3 can be produced by the process according to the third aspect of the present invention. In this case, the crystalline alumina fiber mat used in the first step of the process has a ordinary-state thickness (A) which is preferably 2 to 8 times the thickness (C) of the holder. The compressed thickness (B) of the compressed alumina fiber mat used in the second step of the process is preferably larger than the clearance (D) of the catalytic converter. When the compressed thickness (B) is smaller than the clearance (D), there is a likelihood that the mat cannot exhibit a sufficient restoring force due to the compression hysteresis. Further, the thickness (C) of the holder 3 obtained in the third step is 1 to 1.5 times the compressed thickness (B) of the second step, so that the holder can exhibit the thickness-restoring property upon the thermal decomposition of the organic binder when the opposite surfaces thereof are kept in an open state.

Next, the process for producing a catalytic converter, according to the seventh aspect of the present invention, is described below by referring to FIGS. 1 to 3.

The afore-mentioned process is adapted to produce the catalytic converter comprising a monolith 1 of a cylindrical shape for supporting a catalyst for cleaning exhaust gases thereon, a metal casing 2 connected to exhaust pipes and a holder 3 inserted into a clearance (D) between an outer surface of the monolith 1 and an inner surface of the metal casing 2, and comprises (I) the first step of winding the holder 3 around an outer peripheral surface of the cylindrical monolith 1, and (II) the second step of accommodating the monolith 1 wound with the holder 3, in the metal casing having a two-piece structure composed of an upper shell member 2a and a lower shell member 2b and then bringing the upper and lower shell members 2a and 2b into mating contact with each other, and connecting them together by welding mating peripheral portions thereof. The holder 3 comprises the base mat compressed in its thickness direction and the organic binder uniformly dispersed in the base mat and capable of being dissipated when subjected to thermal decomposition. Further, in the case where the holder 3 is kept in such a compressed condition that the thickness thereof corresponds to the clearance (D) and the organic binder contained therein is subjected to thermal decomposition, the holder 3 can exhibit a restoration surface pressure of 0.1 to 4.0 kg/cm$^2$.

In the afore-mentioned first step, the holder 3 is wound around the outer peripheral surface of the cylindrical monolith 1. The holder 3 is formed at opposite winding ends thereof with a recess and a projection which are brought into mating engagement with each other after completion of the winding.

In the afore-mentioned second step, the monolith 1 around which the holder is completely wound is held in place within the lower shell member 2b and then the upper shell member 2a is brought into mating contact with the lower shell member 2b. The upper and lower shell members 2a and 2b are connected at their peripheral mating portions to each other by welding. In this case, if the thickness (C) of the holder 3 is generally not more than 2 times, preferably not more than 1.7 times, more preferably 1.6 times the clearance (D), a part of the holder can be prevented from projecting outwardly and being interposed between flange portions 21a and 21b.

The catalytic converter illustrated hereinbefore comprises the two-piece metal casing 2. Alternatively, if the metal casing 2 is of an integral cylindrical shape, the monolith 1 around which the holder 3 is wound can be mounted within the metal casing only by pushing the monolith through an open end of the metal casing. In this case, the thickness (C) of the holder 3 is preferably about 1.0 to about 1.7 times the clearance (D).

Next, the process for producing a catalytic converter, according to the eighth aspect of the present invention, is described below by referring to FIGS. 1 to 3.

The afore-mentioned process is adapted to produce the catalytic converter comprising a metal monolith 1 of a cylindrical shape for supporting a catalyst for cleaning exhaust gases thereon, a metal casing 2 accommodating the monolith 1 therein and connected to exhaust pipes and a holder 3 inserted into a clearance (D) between an outer surface of the monolith 1 and an inner surface of the metal casing 2, wherein the monolith 1 which has a honeycomb structure and is composed of ferrite-based stainless steel foils, is supported directly by the holder 3, and the holder 3 is produced by the process comprising (I) the first step of impregnating a base mat with an organic binder solution, (II) the second step of compressing the base mat impregnated with the organic binder solution in the thickness direction and (III) the third step of removing a solvent of the organic binder solution while maintaining the thickness of the compressed base mat. Further, in the case where the holder 3 is kept in such a compressed condition that the thickness thereof corresponds to the clearance (D) and the organic binder contained therein is subjected to thermal decomposition, the holder 3 can exhibit a restoration surface pressure of 0.1 to 4.0 kg/cm$^2$. In the process according to the eighth aspect of the present invention, the same elements as used in the catalytic converter according to the sixth aspect of the present invention can be also used.

As will be understood from the foregoing, the present invention can provide the below-mentioned excellent effects.

That is, the holder according to the present invention and produced by the process according to the present invention is composed of a compressed alumina fiber body having an excellent durability, thereby preventing corrosion or degradation thereof even when exposed to exhaust gases emitted from an internal combustion engine and having a high flow rate and a high temperature. Besides, since the organic binder contained in the holder can be thermally decomposed and dissipated when exposed to the high-temperature exhaust gases, the holder restores its thickness and exhibits an elasticity, so that the clearance between the monolith and the casing can be completely closed to prevent a leakage of the exhaust gases and fly-off of the fiber when exposed to the exhaust gasses having a high flow rate. As a result, the monolith can be retained by a predetermined retention force within the metal casing in a stable manner.

The afore-mentioned holder can also follow change with time in size of the clearance due to change in temperature of the monolith and the metal casing, so that the monolith can be elastically secured within the metal casing. Further, the holder has a thickness-restoring property by which the holder can restore its thickness to an initial thickness of the alumina fiber mat as a base mat, so that the monolith can be stably retained within the casing for a long period of time.

Also, when the afore-mentioned holder is assembled into the catalytic converter, the thickness of the holder is kept much thinner by a bonding force of the organic binder so that the holder can be readily mounted into an interior of the catalytic converter without damage to the holder itself.

The catalytic converter according to the present invention and produced by the process according to the present invention also uses the afore-specified holder. Accordingly, the catalytic converter can withstand violent vibration or impact for a long period of time. Besides, since the holder is readily mounted to the catalytic converter, the production of the catalytic converter is highly facilitated, thereby reducing the production cost of the catalytic converter.

BEST MODE FOR CARRYING OUT THE INVENTION

Next, the present invention is described in more detail by way of examples. However, the present invention is not limited to these examples but intended to involve any variations, changes or modifications thereof, unless they departs from the scope or sprits of the appended claims.

Incidentally, in the following descriptions, the reference numerals used in FIGS. 1 to 3 are also cited and the values from the Examples and Comparative Examples are enumerated in Tables 1 to 3. In addition, "%" represents "% by weight" unless otherwise specified.

EXAMPLE 1

As a base mat, a mullite fiber mat having a ordinary-state thickness (A) of 16 mm, a width of 600 mm and a length of 3600 mm (tradename: "MAFTECBLANKET" produced by Mitsubishi Chemical Corporation, having a bulk density of 0.10 g/cm$^3$, an average fiber diameter of 4 µm and a fiber length of 20 to 200 mm and containing 72% of alumina component and 28% of silica component) was prepared.

When the base mat was compressed so as to reduce its thickness to 5.5 mm, the pressure of 2.0 kg/cm$^2$ was required to maintain the compressed thickness (B) of the compressed mat. The compressed mat was maintained at the compressed thickness (B) for 5 minutes and then the pressure was released, so that the mat was found to have a restoring property capable of restoring its thickness up to 16 mm.

Next, the afore-mentioned base mat was immersed for 1 minutes in a raw organic binder solution (tradename: "LX874" produced by Nippon Zeon Co., Ltd., an aqueous dispersion-type emulsion of acrylate rubbers having a solid content of 45%). Successively, the base mat immersed in the organic binder solution was pressingly sandwiched at the opposite surfaces thereof between two polyester nets each having a mesh size of 0.33 mm and further at the opposite outsides thereof between two punching metals (having a hole diameter of 3.5 mm, an opening percentage of 22.7% and a thickness of 2.3 mm). Thereafter, the base mat was pressed while evacuating on one surface side thereof so as to be compressed to reduce its thickness up to the compressed thickness (B) of 5.5 mm. Next, while maintaining the compressed thickness (B), the compressed base mat is dried by a hot air at 100° C. for 3 hours. After cooling, the polyester nets and the punching metals were removed from the compressed base mat to obtain the aimed holder 3.

The thus-obtained holder 3 had a thickness (C) of 6.0 mm and the (solid) content of the organic binder was 13 parts by weight based on 100 parts by weight of the alumina fiber mat. It was ascertained that the pressure required to compress the holder 3 to the thickness of 4 mm corresponding to the clearance (D) was 4.1 kg/cm$^2$, and the surface pressure, namely the initial surface pressure, of the holder was 4.1 kg/cm$^2$ when mounted to the catalytic converter having the designed clearance (D) of 4 mm. In addition, the thus-obtained holder 3 was cut into strips each having a width of 20 mm and a length of 150 mm. The strips having a width of 20 mm and a span of 80 mm were tested by a tensile testing machine (tradename "Shimadzu Autograph IS-500" manufactured by Shimadzu Seisakusho Co., Ltd.) to measure tensile strength and tensile modulus thereof at stress rate of 5 mm/min (refer to Tables).

Incidentally, if a test specimen has a length of $l_0$, an elongation of $\Delta l$, a tensile strength of Pn and a cross-sectional area of A, a tensile modulus E of the test specimen is given by the following formula:

$$E=(Pn/A)/(66\ l/l_0)$$

Unit tensile strength: $Pa=Pn/A$

Next, the thus-obtained holder 3 was cut into a test specimen. The test specimen was placed in an oven maintained at 800° C. and heated for one hour to thermally decompose the organic binder contained therein. As a result, the thickness (C) of the holder was restored to 15 mm. It was confirmed that the thickness-restoring ratio of the holder was 2.5 when calculated according to the above formula (I).

Further, after the thickness of the holder 3 was restored, the holder was compressed so as to reduce its thickness to 4 mm corresponding to the clearance (D). The pressure required to maintain the thickness of the holder corresponding to the clearance (D) was 4.0 kg/cm$^2$. Accordingly, it was confirmed that after the thus-obtained holder 3 was mounted to the catalytic converter designed to have the clearance (D) of 4 mm and the organic binder was burned, the holder was able to be fixed therein with a restoration surface pressure of 4.0 kg/cm$^2$.

Next, the thus-obtained holder 3 (having the thickness (C) of 6.0 mm) was cut into a strip having a width of 80 mm and a length of 320 mm. After the strip was wound around an outer peripheral surface of the monolith 1 as shown in FIG. 2, the monolith 1 was held in place within the two-piece metal casing 2 (clearance: 4 mm) having such a structure as shown in FIG. 1, to examine a canning property thereof. As a result, the cut strip could be readily wound around the outer peripheral surface of the monolith 1 in a close contact manner. Further, when mounted into an interior of the metal casing 2, the strip was prevented from projecting outwardly and being sandwiched between the flange portions 21a and 21b. It was confirmed that the strip exhibited an excellent canning property.

EXAMPLES 2 to 7

The same procedure as defined in Example 1 was conducted except that base mats each having a bulk density and an ordinary-state thickness (A) as shown in Tables were compressed so as to reduce its thickness to a compressed thickness (B) as also shown in Tables, so that holders 3 having a thickness (C) were obtained.

Each of the thus-obtained holders 3 had a (solid) content of the organic binder as shown in Tables. The pressure required to compress the thus-obtained holder 3 so as to reduce its thickness to that corresponding to the clearance (D), namely the initial pressure, and a unit tensile strength and a tensile modulus thereof measured in the same manner as in Example 1 are shown in Tables.

Further, the thus-obtained holder 3 was cut into a test specimen which was then subjected to the thermal decomposition of the organic binder contained therein in the same manner as described in Example 1. The thickness-restoring ratio and the pressure required to compress the holder 3 having a restored thickness so as to reduce the thickness to that corresponding to the clearance (D), namely the surface pressure after burning, are also shown in Tables.

Next, in order to examine a canning property of each of the catalytic converters, the same procedures as defined in Example 1 were conducted except that two-piece metal casings 2 having the clearances (D) as shown in Tables were used. As a result, the cut test specimen could be readily wound around the outer peripheral surface of the monolith 1 in a close contact manner, and that when the monolith was inserted into an interior of the metal casing, the holder was prevented from projecting outwardly and being sandwiched between the flange portions 21a and 21b. Accordingly, it was confirmed that the catalytic converters had an excellent canning property.

COMPARATIVE EXAMPLE 1

In the same manner as described in Example 1, an alumina fiber mat was impregnated with an organic binder solution and then pressingly sandwiched at the opposite surfaces thereof between two polyester nets each having a mesh size of 0.33 mm and further at the opposite outsides thereof between two punching metals (having a hole diameter of 3.5 mm, an opening rate of 22.7% and a thickness of 2.3 mm). Thereafter, the alumina fiber mat was pressed while evacuating at one surface thereof and compressed so as to reduce its thickness to the compressed thickness (B) of 5.5 mm. Next, instead of the procedure as described in Example 1 in which the mat was dried while maintaining the compressed thickness (B), the one polyester net and the one punching metal both placed on the same side of the mat were removed, and then the alumina fiber mat from one side of which the polyester net and punching metal was removed was dried, so that a molded product having a thickness (C) of 13 mm and containing 13 parts by weight of the organic binder (solid content) could be obtained (see Tables).

Next, the thus-obtained molded product (having the thickness (C) of 13 mm) was cut into a strip as a holder having a width of 80 mm and a length of 320 mm. It was attempted to mount the holder together with the monolith to the two-piece metal casing having such a structure as shown in FIG. 1. However, it was difficult to wind the bulky strip-shaped holder around the outer peripheral surface of the monolith 1. Further, at the time of canning, the holder considerably projected outwardly and therefore a large portion of the holder was sandwiched between the flange portions 21a and 21b. As a result, the holder could not be mounted within the metal casing (see Tables).

EXAMPLE 8

As a base mat, a mullite fiber mat having a ordinary-state thickness (A) of 12 mm, a width of 600 mm and a length of 3600 mm (tradename: "MAFTECBLANKET" produced by Mitsubishi Chemical Corporation, having a bulk density of 0.1 g/cm$^3$, an average fiber diameter of 4 $\mu$m and a fiber length of 20 to 200 mm and containing 72% of alumina component and 28% of silica component) was prepared.

Next, the base mat was treated in the same manner as defined in Example 1 to obtain a holder 3 having a thickness (C) of 6.0 mm and a bulk density of 0.23 g/cm$^3$ and containing 15 parts by weight of the organic binder (solid content). When the afore-mentioned base mat having no organic binder was compressed so as to reduce its thickness up to 4 mm, the pressure required was 2.1 kg/cm$^2$. When the molded product impregnated with the organic binder was also compressed so as to reduce its thickness up to 4 mm, the pressure required, namely the initial surface pressure was 2.2 kg/cm$^2$. As a result, it was confirmed that the organic binder could restrict the restoration of the thickness of the compressed mat without damages to properties thereof. In addition, the thus-obtained holder 3 was measured for its thickness-restoring ratio by the same method as defined in Example 1. The measurement revealed that the thickness-restoring ratio was 2.0 (see Tables).

Next, a stainless steel foil in the form of a flat foil comprising 20% of Cr and 5% of Al, and having a thickness of 60 $\mu$m, and a corrugated foil having a wave height of 1.25 mm and a pitch of 2.5 mm were laminated together and then rolled. The rolled foils were joined together by diffusion method in a vacuum furnace to prepare a monolith 1 having a diameter of 89 mm and a length of 130 mm. Successively, after an alumina coating layer was formed on the thus-prepared monolith 1, Pt and Ph as catalytic components were supported thereon. The afore-mentioned holder 3 was wound around the outer peripheral surface of the monolith 1 on which the catalyst was supported, in such a manner as illustrated in FIG. 2. The monolith 1 was accommodated within the metal casing 2 having such a structure as illustrated in FIG. 1 to produce a catalytic converter. When calculated from a value of the clearance (D), the thickness (C) and the bulk density upon mounting of the holder 3 were 4.0 mm and 0.35 g/cm$^3$, respectively (see Tables).

In the afore-mentioned assembling, it was ascertained that the holder 3 was appropriately mounted to the metal casing without leaking a part of the holder to be sandwiched between the flange portions 21a and 21b. Successively, the thus-assembled catalytic converter was mounted to an engine-testing apparatus and subjected to a high-temperature heat cycle test at a temperature from a normal temperature to 830° C. for 600 cycles. As a result, it was found that any leakage from the outer peripheral surface of the monolith 1 due to poor sealing was not caused. Further, the disassembling of the catalytic converter after the test revealed that any displacement and buckling of the monolith 1 were not caused.

EXAMPLE 9

The same procedure as defined in Example 8 was conducted except that a base mat having an ordinary-state thickness (A) of 15 mm was used, so that a holder 3 having a thickness (C) of 6.8 mm and a bulk density of 0.26 g/cm$^3$, and containing 20 parts by weight of the organic binder (solid content) was obtained.

When the thus-obtained holder 3 was compressed so as to reduce its thickness up to 4.0 mm, it was confirmed that the pressure required therefor, namely the initial pressure, was 4.0 kg/cm$^2$. The thickness-restoring ratio and the surface pressure after burning both measured in the same manner as defined in Example 1 were shown in Tables.

Next, the same procedure as defined in Example 8 was conducted to produce a catalytic converter. The thickness (C) of the holder 3 mounted within the metal casing 2 and the bulk density of the holder 3 upon mounting were 4.0 mm and 0.45 g/cm$^3$, respectively (see Tables).

Successively, the thus-produced catalytic converter was subjected to a high-temperature heat cycle test in the same manner as defined in Example 8. As a result, it was found that any leakage from the outer peripheral surface of the monolith 1 due to poor sealing was not caused. However, since slight deformation of the monolith 1 was observed, the above-measured bulk density of the holder upon mounting was considered to be an upper limit thereof.

EXAMPLE 10

A base mat having the same composition as used in Example 1 except for an ordinary-state thickness (A) of 8 mm and a bulk density of 0.05 g/cm$^3$, was impregnated with the same organic binder as used in Example 1, so that a molded product as a holder 3 having a thickness (C) of 6.0 mm and a bulk density of 0.07 g/cm$^3$ and containing 5 parts by weight of the organic binder (solid content) was obtained. When the thus-obtained holder 3 was compressed so as to reduce its thickness up to 4.0 mm, it was confirmed that the pressure required therefor was 0.1 kg/cm$^2$. Successively, a monolith 1 carrying a catalyst thereon was produced under the same conditions as defined in Example 1 and accommodated within a metal casing 2 to produce a catalytic converter. The holder 3 mounted within the metal casing 2 had a thickness (C) of 4.0 mm and a bulk density upon mounting of 0.105 g/cm$^3$ (see Tables).

Successively, the thus-produced catalytic converter was subjected to a high-temperature heat cycle test in the same manner as defined in Example 1. As a result, it was found that any buckling of the monolith 1 and any leakage from the outer peripheral surface of the monolith 1 due to poor sealing were not caused. However, since slight displacement of the monolith 1 was observed, the above-measured bulk density of the holder upon mounting was considered to be a lower limit thereof.

EXAMPLE 11

The same procedure as defined in Example 8 was conducted except that a base mat having an ordinary-state thickness (A) of 6 mm was used, so that a holder 3 having a thickness (C) of 5.5 mm and a bulk density of 0.13 g/cm$^3$, and containing 20 parts by weight of the organic binder (solid content) was obtained.

When the thus-obtained holder 3 was compressed so as to reduce its thickness up to 4.0 mm, it was confirmed that the pressure required therefor, namely the initial pressure, was 0.6 kg/cm$^2$. In addition, the unit tensile strength, the tensile modulus, the thickness-restoring ratio and the surface pressure after burning all measured in the same manner as defined in Example 1 were shown in Table.

Next, a stainless steel foil in the form of a flat foil comprising 13% of Cr and 2% of Si and having a thickness of 40 μm, and a corrugated foil having a wave height of 1.25 mm and a pitch of 2.5 mm were laminated together and then rolled. The rolled foils were joined together by diffusion method in a vacuum furnace to prepare a monolith 1 having a diameter of 89 mm and a length of 130 mm. Successively, the catalyst was supported on the thus-prepared monolith in the same conditions as defined in Example 1. The aforementioned holder 3 was wound around the outer peripheral surface of the monolith 1 on which the catalyst was supported, in such a manner as illustrated in FIG. 2. The monolith 1 was accommodated within the metal casing 2 having an inner diameter of 97 mm to produce a catalytic converter. The thickness (C) and the bulk density upon mounting of the holder 3 were 4.0 mm and 0.18 g/cm$^3$, respectively (see Tables).

The thus-produced catalytic converter was subjected to a high-temperature heat cycle test in the same manner as defined in Example 1. As a result, it was found that any displacement of the monolith 1, any leakage from the outer peripheral surface of the monolith 1 due to poor sealing and any buckling of the monolith 1 were not caused. Further, the analysis after the test revealed that no leakage nor buckling of the monolith 1 were caused.

COMPARATIVE EXAMPLE 2

The same procedure as defined in Example 8 was conducted except that a commercially-available thermally-expansive base mat having an ordinary-state thickness (A) of 5.5 mm and a bulk density of 0.61 g/cm$^3$ was used, so that a catalytic converter was produced. The thus-produced catalytic converter was subjected to a high-temperature heat cycle test in the same manner as defined above. As a result, when 50 cycles was reached, the monolith 1 was slipped and removed from the holder. It was revealed that buckling was caused over the entire outer peripheral surface of the monolith 1 thus removed, and that the diameter of the monolith was reduced from 89 mm upon mounting to 86 mm.

TABLE 1

| Example No. | Base mat Thickness A (mm) | Base mat Bulk density (g/cm$^3$) | Compressed thickness B (mm) | Amount of binder (part by weight) | Holder Thickness C (mm) | Holder Bulk density (g/cm$^3$) |
|---|---|---|---|---|---|---|
| Example 1 | 16 | 0.1 | 5.5 | 13 | 6.0 | 0.30 |
| Example 2 | 16 | 0.05 | 5.5 | 20 | 6.0 | 0.16 |
| Example 3 | 12 | 0.05 | 5.5 | 20 | 5.5 | 0.13 |
| Example 4 | 35 | 0.05 | 3.0 | 17 | 3.5 | 0.60 |
| Example 5 | 16 | 0.1 | 6.0 | 25 | 7.0 | 0.29 |
| Example 6 | 16 | 0.1 | 6.0 | 25 | 7.0 | 0.29 |
| Example 7 | 16 | 0.1 | 6.0 | 25 | 7.0 | 0.29 |
| Example 8 | 12 | 0.1 | 5.5 | 15 | 6.0 | 0.23 |
| Example 9 | 15 | 0.1 | 5.5 | 20 | 6.8 | 0.26 |
| Example 10 | 8 | 0.05 | 5.5 | 5 | 6.0 | 0.07 |
| Example 11 | 6 | 0.1 | 5.5 | 20 | 5.5 | 0.13 |
| Comparative Example 1 | 16 | 0.1 | 5.5 | 13 | 13 | 0.14 |
| Comparative Example 2 | 5.5 | 0.61 | 5.5 | 15 | 6.0 | — |

TABLE 2

| Example No. | Clearance D (mm) | Initial pressure upon mounting (kg/cm$^2$) | Bulk density upon mounting (g/cm$^3$) | Restoration surface pressure after burning (kg/cm$^2$) | Bulk density after burning (g/cm$^3$) |
|---|---|---|---|---|---|
| Example 1 | 4.0 | 4.1 | 0.45 | 4.0 | 0.40 |
| Example 2 | 4.0 | 0.5 | 0.24 | 0.9 | 0.20 |
| Example 3 | 4.0 | 0.6 | 0.18 | 0.6 | 0.15 |
| Example 4 | 3.0 | 6.9 | 0.70 | 9.8 | 0.58 |
| Example 5 | 4.0 | 5.0 | 0.50 | 4.3 | 0.40 |
| Example 6 | 7.0 | 0 | 0.29 | 1.1 | 0.23 |
| Example 7 | 6.5 | 0.3 | 0.31 | 1.5 | 0.25 |
| Example 8 | 4.0 | 2.2 | 0.35 | 2.1 | 0.30 |
| Example 9 | 4.0 | 4.0 | 0.45 | 3.8 | 0.38 |
| Example 10 | 4.0 | 0.1 | 0.11 | 0.1 | 0.10 |
| Example 11 | 4.0 | 0.6 | 0.18 | 0.6 | 0.15 |
| Comparative Example 1 | 4.0 | Difficult to install | | | |
| Comparative Example 2 | 4.0 | Removal or buckling of monolith | | | |

TABLE 3

| Example No. | Ratio between thickness of holder C/B | Ratio between thickness of holder A/C | Ratio between thickness of holder C/D | Unit tensile strength ((kg/cm$^2$) | Tensile modulus (kg/cm$^2$) | Thickness-restoring ratio |
|---|---|---|---|---|---|---|
| Example 1 | 1.1 | 2.7 | 1.5 | 24 | 550 | 2.5 |
| Example 2 | 1.1 | 2.7 | 1.5 | 23 | 580 | 2.5 |
| Example 3 | 1.0 | 2.2 | 1.4 | 19 | 390 | 2.2 |
| Example 4 | 1.2 | 10 | 1.2 | 25 | 500 | 8.6 |
| Example 5 | 1.2 | 2.3 | 1.8 | 34 | 610 | 2.1 |
| Example 6 | 1.2 | 2.3 | 1.0 | 34 | 610 | 2.1 |
| Example 7 | 1.2 | 2.3 | 1.1 | 34 | 610 | 2.1 |
| Example 8 | 1.1 | 2.0 | 1.5 | 28 | 540 | 2.0 |
| Example 9 | 1.2 | 2.2 | 1.7 | 23 | 370 | 2.2 |
| Example 10 | 1.1 | 1.3 | 1.5 | 3 | 170 | 1.3 |
| Example 11 | 1.0 | 1.1 | 1.4 | 19 | 360 | 1.1 |
| Comparative Example 1 | 2.4 | 1.2 | 3.3 | — | — | — |
| Comparative Example 2 | — | — | — | — | — | — |

INDUSTRIAL APPLICABILITY

The holder for monolith according to the present invention is readily mounted within a casing while being maintained in an compressed state, and restores its thickness when an organic binder contained therein is thermally decomposed, so that the monolith can be stably supported in the casing for a long period of time, and a gas sealing properties thereof can be assured. In addition, a catalytic converter using the afore-specified holder for monolith can stably retain the monolith against violent vibration or impact and can exhibit an excellent durability. Accordingly, the present invention is effectively applicable to a high-performance catalytic converter mounted to internal combustion engines of various vehicles for which a high cleaning efficiency is required.

What is claimed is:

1. A process for producing a monolith-holding element for use in a catalytic converter having a cylindrical monolith supporting a catalyst for cleaning exhaust gases thereon, a metal casing, accommodating said monolith therein, connected to exhaust pipes, said monolith-holding element fitted into a clearance between an outer surface of the monolith and an inner surface of the metal casing, the process comprising:

providing an alumina fiber mat having a first uncompressed thickness, the alumina fiber mat having a bulk density of 0.05 to 0.20 $g/cm^3$;

impregnating the alumina fiber mat with a solution containing a solvent and an organic binder capable of being dissipated by thermal decomposition;

compressing the alumina fiber mat impregnated with the organic binder-containing solution in the thickness direction so as to produce a second compressed thickness thereof reduced by ½ to 1/15 times the first uncompressed thickness;

removing the solvent while simultaneously maintaining the second compressed thickness of the alumina fiber mat, leaving the organic binder within the compressed alumina fiber mat;

releasing the compression to provide a monolith-holding element having an uncompressed third thickness of 1 to 1.5 times the second compressed thickness of the alumina fiber mat, the remaining organic binder having a binding force sufficient to suppress the restoration of the alumina fiber mat to the first uncompressed thickness;

fitting the monolith-holding element into the clearance between the outer surface of the monolith and the inner surface of the metal casing; and, thermally decomposing the organic binder such that the monolith-holding element exhibits a thickness restoring property with opposite surfaces thereof being kept in an open state, and a restoration surface pressure when kept under a compressed condition corresponding to the clearance, in the range of 0.5 to 30 $kg/cm^2$.

2. A process for producing a catalytic converter comprising: providing a cylindrical monolith supporting a catalyst for cleaning exhaust gases thereon, said monolith being composed of a ferrite-based stainless steel foil and having a honeycomb structure;

providing a metal casing connected to exhaust pipes, providing an alumina fiber mat having a first uncompressed thickness, impregnating the alumina fiber mat with a solution containing an organic binder, compressing said alumina fiber mat impregnated with said organic binder-containing solution in the thickness direction to a second compressed thickness;

simultaneously removing a solvent of said organic binder-containing solution while maintaining the second thickness of the compressed alumina fiber mat, leaving the organic binder in the compressed alumina fiber mat:

releasing the compression such that a monolith holding element is produced having a third uncompressed thickness that is 1.0 to 1.5 times the second thickness, the remaining organic binder preventing restoration of the alumina mat to the first uncompressed thickness;

fitting the monolith-holding element having the third uncompressed thickness into a clearance between an outer peripheral surface of said monolith and an inner peripheral surface of said metal casing, wherein when said organic binder is thermally decomposed, a restoration surface pressure of said monolith-holding element being kept under a compressed condition where the thickness thereof is reduced to that corresponding to said clearance, is in the range of 0.1 to 4.0 $kg/cm^2$.

* * * * *